United States Patent Office 3,072,031
Patented Jan. 8, 1963

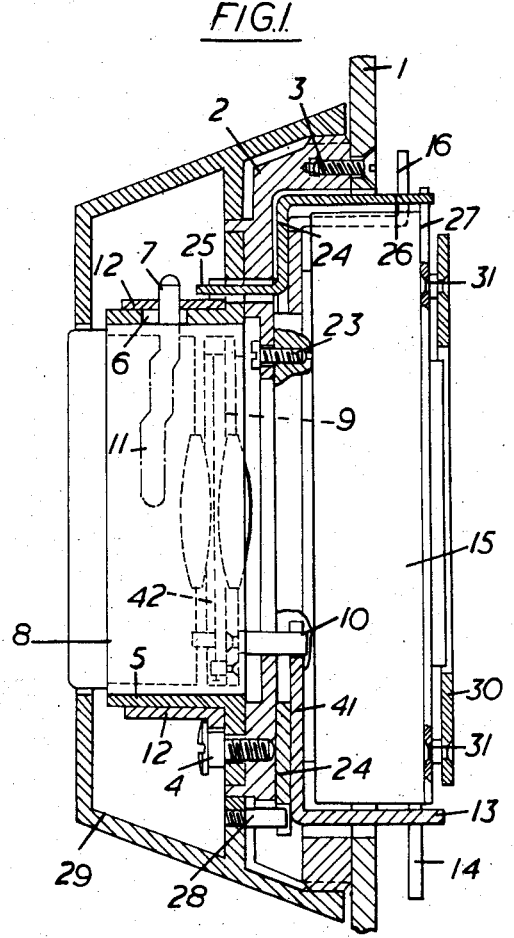

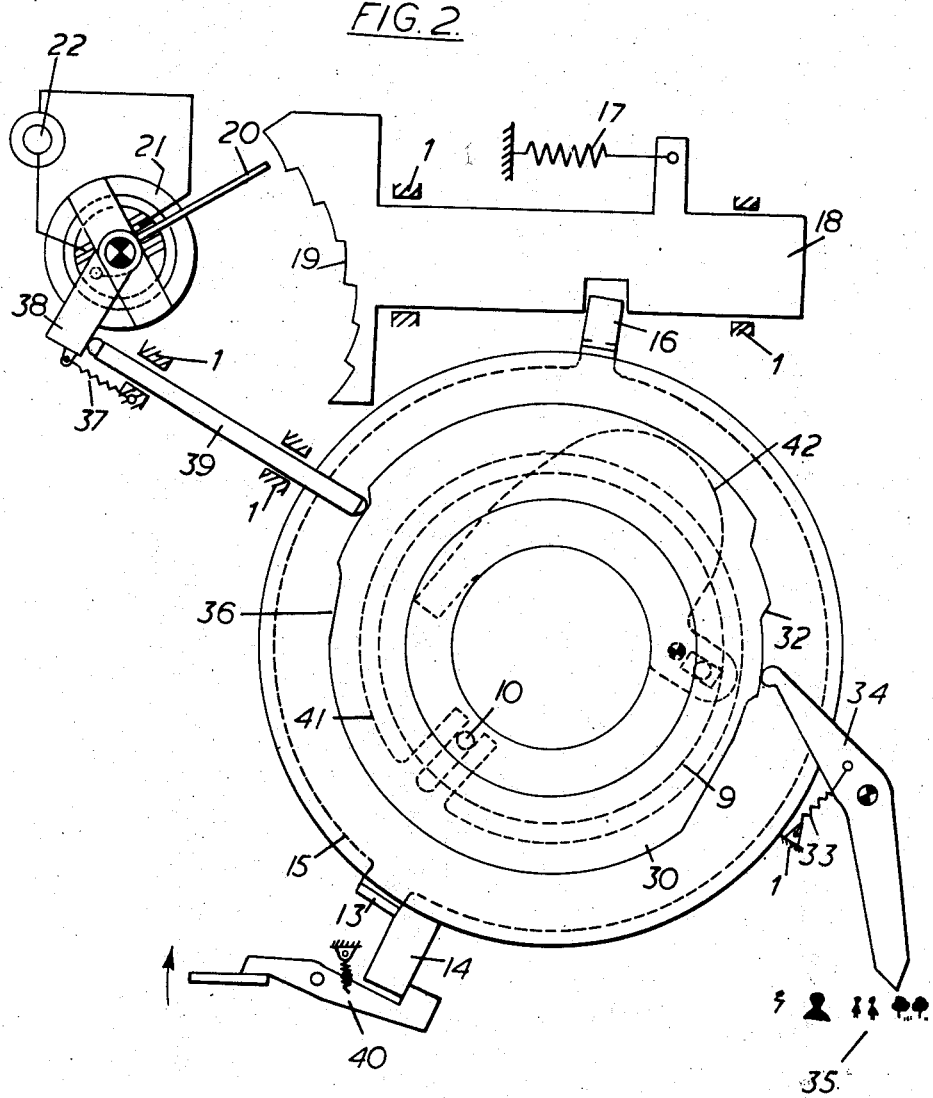

3,072,031
PHOTOGRAPHIC CAMERA
Siegfried Böhm, Werner Hahn, Walter Hennig, Klaus Hintze, and Johannes Weise, all of Dresden, Germany, assignors to VEB Kamera- und Kinowerke Dresden, Dresden, Germany
Filed Jan. 16, 1961, Ser. No. 82,896
6 Claims. (Cl. 95—10)

The present invention relates to a photographic camera having adjusting means for range and exposure time, and aims at facilitating adjustment.

In known cameras the time of exposure and the range were separately adjustable. Every user of a camera of this type consequently had to set the time of exposure and the range independently of one another, which caused difficulties particularly to those less skilled and gave rise to faulty exposures. Through the multiplicity of operations required for adjusting the camera, moreover, a loss of time resulted so that on occasion unique opportunities of making photographs were lost.

The purpose of the invention is to avoid the above-mentioned disadvantages through a common adjusting device for time of exposure and range.

According to the invention this is achieved by coupling together the adjusting means for time of exposure and range and arranging them to be adjustable through a common adjusting device in accordance with a subject scale. For the adjustment at choice to all possible subjects, a single adjusting tube is preferably provided because the arrangement of, for example, push-buttons would make the adjustment difficult to supervise in view of the large number of subjects to be selected, and might give rise to the blocking of the push-buttons. This adjusting tube is advantageously mounted rotatably concentrically to the axis of the objective and through a coupling pin is connected to an adjusting ring which in turn engages through lugs on the one hand with the adjusting means for the time of exposure and on the other hand with the adjusting means for the range. According to a particular feature of the invention, the adjusting tube is preferably so constructed that it covers the objective projecting out of the front wall of the camera. For the purpose of the automatic adjustment of the diaphragm moreover the adjusting tube is preferably coupled through the adjusting ring to the adjusting lever of a galvanometer controlled by a photo-cell, the pointer of the galvanometer limiting the movement of the adjusting slide for the objective diaphragm. Details of the invention can be seen from the example of its performance described below and illustrated in the accompanying drawings, in which:

FIGURE 1 shows a section through the adjusting device; and

FIGURE 2 the rear of the adjusting device with the automatic diaphragm control.

The objective carrier 2 is joined fast by means of screws 3 to the camera housing 1 and in turn carries with the aid of screws 4 the objective guide 5 (see FIGURE 1). The pin 7 of an objective 8 adjustable in the direction of the optical axis projects through a slot 6, running in the direction of the optical axis, in the objective guide 5. In the objective 8 a diaphragm 42 of known construction is provided, while its pin 10, fastened to the rotatable diaphragm ring 9, projects from the rear of the objective 8. The pin 7 engages in the control cam 11 of a range adjusting means 12, which is likewise held rotatably on the objective carrier 5 by the screws 4. The pin 10 is in engagement with a diaphragm adjusting means 41, the first lug 13 of which lies in the path of the cocking lever 14 of the objective shutter 15, while its second lug 16 is in engagement with an adjusting slide 18 loaded by the spring 17 (see FIGURE 2). In the path of the stepped cam 19 of the adjusting slide 18 lies the pointer 20 of a galvanometer 21, which is controlled in a known manner by a photo-cell 22 and limits the movement of the adjusting slide 18.

The objective shutter 15 is fastened by means of the screws 23 to the objective carrier 2 (see FIGURE 1), and on its side facing the objective 8 an adjusting ring 24 is rotatably mounted. This adjusting ring 24 is in engagement on the one hand through the arm 25 with the control tube 12 and on the other hand through the arm 26 with the annular time adjusting means 27, which in a known manner controls through a time cam of any desired shape a regulating device for different times of exposure. A coupling pin 28, which engages with the adjusting ring 24, is mounted in an adjusting tube 29 constructed as a covering cap. A control disc 30 is joined fast by rivets 31 to the time adjusting means 27, and its feeler cam 32 moves a subject pointer 34, held by a spring 33 in engagement with the feeler cam 32, while its guide cam 36 through a guide push-rod 39 moves the adjusting lever 38 of the galvanometer 21, the said adjusting lever 38 being drawn by an adjusting spring 37 against the guide push-rod 39.

The mode of operation of the device is as follows: The objective shutter is cocked by turning the cocking lever 14 in the clockwise direction (FIGURE 2). The cocking lever 14 at the same time moves the lug 13 of the diaphragm adjusting means 41 against the action of the spring 17, while the adjusting slide 18 is lifted off the pointer 20 of the galvanometer 21. The cocking lever 14 together with the diaphragm adjusting means 41 is held in the cocked position by the release lever 40.

The range setting means 12 and the time setting means 27 are turned through the adjusting ring 24 by turning the adjusting tube 29. The objective 8 is thereby displaced in the objective guide 5, while at the same time a time of exposure adapted to the range set is adjusted in accordance with the shape of the time cam on the time adjusting means 27. This predetermined pairing of exposure time and range is visible with the aid of a subject scale 35 through the feeler cam 32 and the subject pointer 34, so that all reflection regarding the values to be set for time of exposure and range is dispensed with. In addition, by turning the control disc 30 the time of exposure is communicated as a guide value to the galvanometer 21 through the guide push-rod 39 in the form of a rotation (see FIGURE 2).

If the release lever 40 is then turned in the direction of the arrow, the cocking lever 14 of the objective shutter 15 runs down and is followed immediately by the lug 13 of the diaphragm shutting means 43 in consequence of the spring 17 on the adjusting slide 18, until the stepped curve 19 of the adjusting slide 18 bears against the pointer 20 of the galvanometer 21.

We claim:

1. In a photographic camera having a housing, an adjusting tube rotatably mounted concentrically to the objective axis of said camera, an adjusting ring rotatably mounted concentrically to the objective axis of said camera and adjacent to said adjusting tube, a coupling pin operatively connecting said adjusting tube and said adjusting ring together, arm means disposed on said adjusting ring, time adjusting means to adjust the time of exposure of said camera, range adjusting means to adjust the range of said camera, one of said arm means of said adjusting ring engaging said time adjusting means while another of said arm means of said adjusting ring engages said range adjusting means, a diaphragm pivotally mounted on said camera, and automatic adjusting means operatively connected to said adjusting tube through said adjusting ring for automatically controlling the movement of said diaphragm.

2. In a photographic camera according to claim 1 in which said automatic adjusting means includes a diaphragm adjusting means having lug means, a pin disposed between said diaphragm and said diaphragm adjusting means, an adjusting slide having biasing means to bias said adjusting slide in one direction and cam means, said lug means engaging said adjusting slide, and galvanometer means having pointer means engaging said cam means to control movement of said adjusting slide.

3. In a photographic camera according to claim 1 in which said time adjusting means carries a control disc having a feeler cam and a guide cam, a subject pointer pivotally mounted on said camera having one end engaging said feeler cam and the other end pointing to a subject scale, and a guide push rod disposed between said guide cam and said automatic adjusting means to guide said automatic adjusting means for automatically controlling the movement of said diaphragm.

4. In a photographic camera according to claim 2 in which said diaphragm adjusting means has a further lug means, an objective shutter means rotatably mounted concentrically to the objective axis of said camera, a cocking lever disposed from said objective shutter means, a biased release lever pivotally mounted on said camera to engage said cocking lever and maintain said cocking lever in an operative position wherein said cocking lever engages said further lug means to rotate said diaphragm adjusting means so that said lug means engaging said adjusting slide moves said adjusting slide against the action of said biasing means.

5. In a photographic camera according to claim 1 in which an objective projects out from the front of said camera and said adjusting tube is conically shaped to encompass said objective.

6. In a photographic camera according to claim 2 in which said galvanometer means includes a photoelectric cell and an adjusting lever controlled by said photoelectric cell, said adjusting lever being biased and operatively connected to said time adjusting means to control movement of said adjusting slide.

References Cited in the file of this patent

UNITED STATES PATENTS 2,990,758     Sauer _____ July 4, 1961

FOREIGN PATENTS 1,111,448     France _____ Oct. 26, 1955

OTHER REFERENCES

German printed application Z4899 IX/57a March 8, 1956.